United States Patent [19]

Danner

[11] 4,185,838
[45] Jan. 29, 1980

[54] TWO-ELEMENT LIP-TYPE SEAL

[75] Inventor: Bill A. Danner, Rochester, Ill.

[73] Assignee: Fiat-Allis Construction Machinery, Inc., Deerfield, Ill.

[21] Appl. No.: 855,025

[22] Filed: Nov. 25, 1977

[51] Int. Cl.² .............................................. F16J 15/32
[52] U.S. Cl. ...................................... 277/58; 277/82; 277/152; 305/11
[58] Field of Search .................... 305/11, 14, 57 R; 277/35, 37, 38, 39, 40, 91, 92, 152, 153, 58, 63, 181, 182, 183, 184, 185, 82, 94, 25

[56] References Cited

U.S. PATENT DOCUMENTS

| | | | |
|---|---|---|---|
| 2,750,214 | 6/1956 | Bermingham | 277/25 |
| 2,945,708 | 7/1960 | Stephens | 277/82 |
| 3,021,161 | 2/1962 | Rhoads et al. | 277/39 |
| 3,306,223 | 2/1967 | Liebig | 277/82 |
| 3,792,912 | 2/1974 | Howe et al. | 277/94 |
| 4,049,281 | 9/1977 | Bainard | 277/37 |
| 4,062,550 | 12/1977 | Satsumabayashi | 277/92 |
| 4,106,781 | 8/1978 | Benjamin | 277/152 |

Primary Examiner—Robert I. Smith
Attorney, Agent, or Firm—August E. Roehrig, Jr.; Robert A. Brown; Harvey W. Rockwell

[57] ABSTRACT

A two-element seal assembly for sealing relatively rotatable members wherein each seal element has annular radial lip type sealing contact with the other. The seal elements are shaped in a complementary fashion, one with relation to the other, whereby an annular labyrinth is formed therebetween and entrance of damaging materials into sealed area of an installation is effectively excluded by the lip seals and the labyrinth.

5 Claims, 3 Drawing Figures

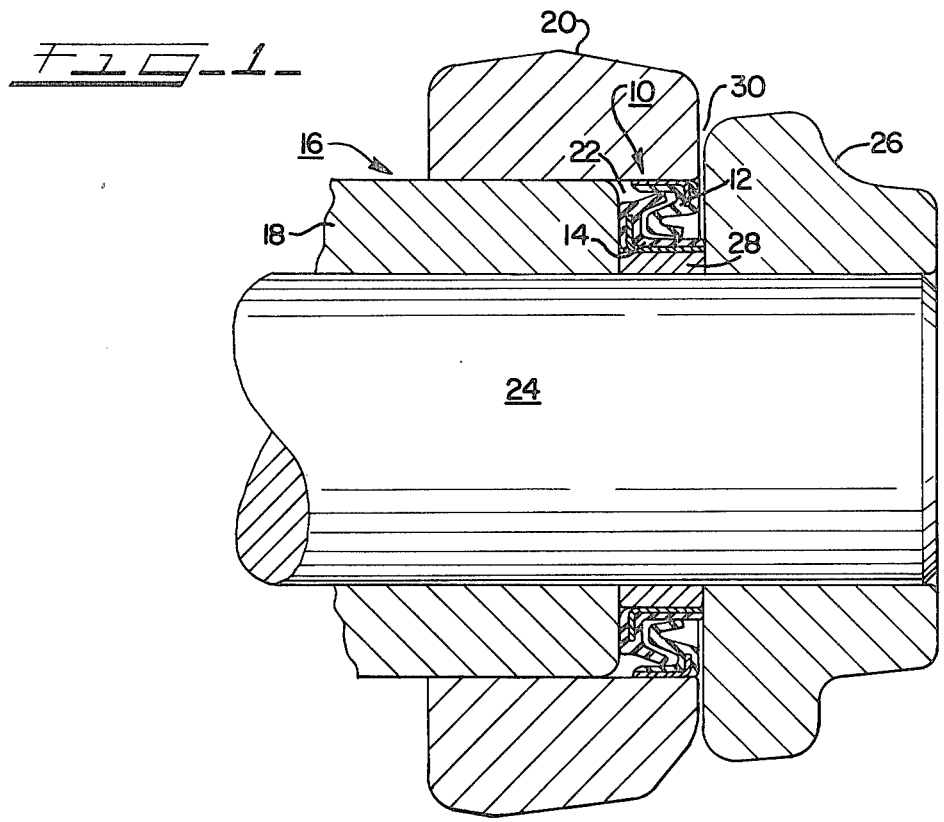
FIG-1
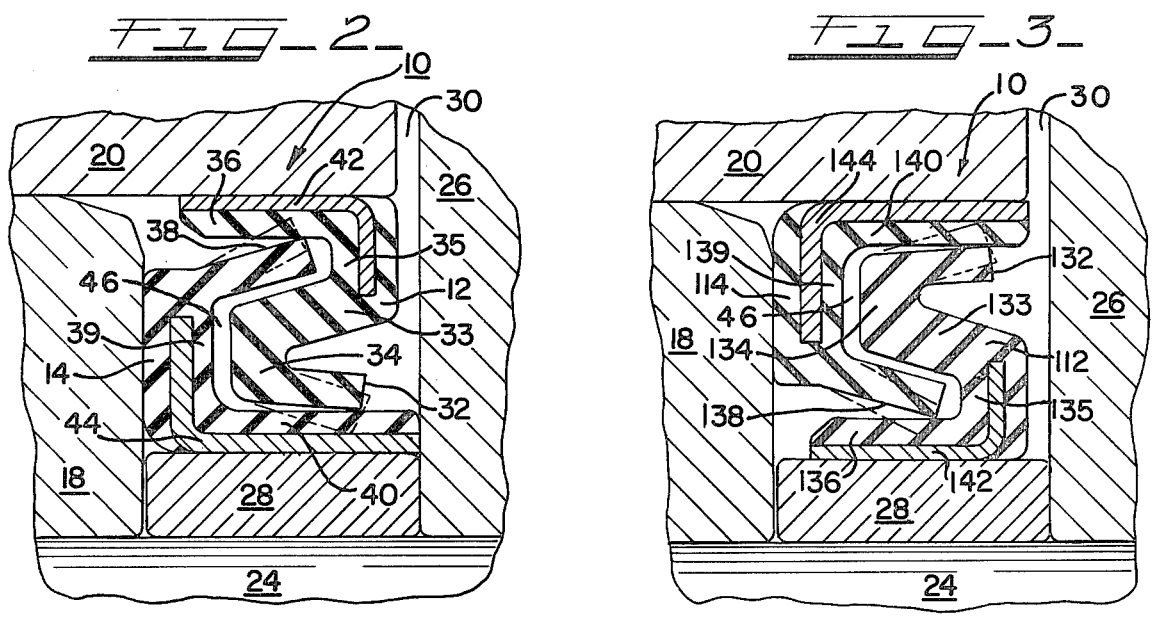
FIG-2
FIG-3

TWO-ELEMENT LIP-TYPE SEAL

BACKGROUND OF THE INVENTION

This invention relates to a seal and more particularly to a radial lip type seal, including a labyrinth therein, for sealing relatively rotatable members such as, but not limited to, joints in crawler tractor track linkage, hydraulic motor cylinder trunnions and various lever systems generally characterized as subject to oscillatory motion.

One prior art patent U.S. Pat. No. 2,750,214 discloses a two-piece seal wherein sealing is effected between the two pieces. Although some similarity may be apparent with reference to this prior art and the present disclosure, it will be seen from a description hereinafter set forth that substantial distinction exists therebetween.

Further prior art specifically relating to radial lip type seals, sometimes referred to as "wiper type" seals, may be found in various seal industry sales brochures and engineering manuals. For example, catalog 457010 issued May 1975 by the Chicago Rawhide Manufacturing Company, 900 North State St., Elgin, Illinois 60120 illustrates on pages 52, 53 and 54 many types and styles.

The environment under which seals operate in the before mentioned installations is generally recognized as being extremely severe. For example, track link joints of track-laying machines are exposed to ground surface conditions varying from dry dust and sand to mud slurry. These are usually very abrasive materials which may penetrate through the seal causing accelerated wear of the joint bearings resulting in machine downtime periods and costly repairs. Many prior art seals for track link joints are of the face type in which a seal element is urged axially into sealing contact by a resilient element against a joint member face. In this type of seal, as well as in prior art radial lip type seals, a barrier against entrance of damaging materials is provided by a single sealing medium wherein the seal element, a radial lip or an axial face, bears against a relatively rotating member usually a shaft or a track bushing end. In either case the relative motion in combination with abrasive materials tends to cause grooves to wear in these members thereby resulting in shorter than desired effective life of the sealing capability and a requirement to frequently replace expensive components.

The present invention represents a substantial improvement over the prior art because it includes a plurality of sealing mediums rather than a single medium. Further, the sealing action wear resulting from one relatively rotating member with another is between the two elements of the seal rather than between a seal element and a relatively expensive shaft or a member such as a track bushing. The importance of this is emphasized when considering the fact that some machines are composed of as many as a hundred and fifty seals subjected to the above mentioned kind of service.

SUMMARY OF THE INVENTION

It is, therefore, an objective of this invention to reduce the cost of operating and maintaining a machine by having seals constructed in accordance with the present invention.

Another object of this invention is to reduce the amount of damaging material passing through the seal to a joint bearing area by providing a plurality of sealing mediums.

Another object is to confine the wear associated with the sealing function to the seal assembly thereby minimizing the cost of parts replacement.

A further object of this invention is to facilitate easier installation procedures in which a seal configured in accordance with the present invention is less sensitive to manufacturing variations with regard to joint components.

It is still another object of this invention to construct a seal in a shape and of material whereby it is readily adaptable to various machine installation sealing requirements.

These and other objects are obtained in accordance with the present invention in which there is provided a two-element seal assembly for sealing relatively rotatable members wherein each seal element has annular radial lip type sealing contact with the other. The seal elements are shaped in a complementary fashion, one with relation to the other, whereby an annular labyrinth is formed therebetween and entrance of damaging materials into the sealed area of an installation is effectively excluded by the lip seals and the labyrinth.

DESCRIPTION OF THE DRAWINGS

In the drawings,

FIG. 1 is a fragmentary cross-sectional view of a track link joint showing a seal which embodies the present invention;

FIG. 2 is an enlargement of a portion of FIG. 1 showing an embodiment of the present invention including dotted lines to indicate free lip positions prior to assembling the two elements one with the other;

FIG. 3 is an alternate embodiment of the present invention, a reversal modification of FIG. 2.

DETAILED DESCRIPTION OF THE INVENTION

The seal of the present invention is adaptable to many different joint sealing installations typically represented by a crawler tractor track link joint partially shown in FIG. 1 wherein a seal assembly is identified generally by the numeral 10. The seal assembly 10 is shown in greater detail in FIG. 2 and is seen to be comprised of a seal outer element 12 and a seal inner element 14.

Referring particularly to FIG. 1 the relationship of the seal elements 12 and 14 to a track link joint is generally identified by the numeral 16. A track bushing 18 is press fit partially through a bored hole in a link inner end 20 of a first pair of track links which are otherwise not shown herein. The remaining portion of the link 20 bore not engaged by the bushing 18 forms an annular recess 22 which accommodates the seal assembly 10. A track pin 24, one end being shown, is disposed for bearing engagement within bushing 18 to permit relative pivotal motion therebetween. A second pair of track links shown only as a link outer end 26 contains an axially bored hole having a press fit over the end of the pin 24. Also press fit over the pin 24 is a spacer ring 28 axially spacing the link outer end 26 from the track bushing 18. The outer periphery of the spacer ring 28 is in press fit relation with the inner diameter of the seal inner element 14 of the seal assembly 10.

It is therefore seen that the elements of track link joint 16 and the seal assembly 10 elements are assembled whereby the bushing 18, the link inner end 20 and the seal outer element 12 are relatively rotatable as a unit about the axis of the track pin 24 which is assembled as a unit with the link outer end 26, the spacer ring 28 and the seal inner element 14. Although not illustrated, it is to be understood that a complete track joint is comprised of one each of the pin 24 and bushing 18 assembled with pairs of the other components. Further, it is to be understood that a plurality of the joints as herein described are also assembled to form a strand of flexible track upon which a crawler tractor travels. The flexing of the track at the joint under loaded conditions results in radial load bearing contact between the pin 24 and the bushing 18 and thrust load bearing contact between an end of the bushing 18 and a contacting end of the spacer ring 28. Further, relative motion contact for sealingly excluding damaging material from these bearing members is provided by the seal elements 12 and 14 one with relation to the other.

It should be noted that the only path by which damaging material can enter the bearings of the joint 16 is through a clearance gap 30 between the link inner end 20 and the link outer end 26. The seal assembly 10 effectively blocks this path because of construction details hereinafter defined with reference to FIG. 2.

A first seal lip 32 is formed as an inside diameter portion of the seal outer element 12. In the cross sectional view of the annularly formed seal element the lip 32 is a lower extremity of a reverse-shaped "S" figure wherein a first body portion 33 and a lower bend portion 34 cooperate in combination with elastomeric resilient composition thereof to permit radial expansion and contraction of the lip 32. The body portion 33 in its radially outward formation becomes an upper bend portion 35 which transfigures into a cylindrical outer support 36.

A second seal lip 38 is formed as an outside diameter portion of the seal inner element 14. In the cross sectional view of the annularly formed seal element the lip 38 is an upper extremity of a "C" shaped figure whose inner boundary is shaped in a complementary fashion with reference to an outer bend boundary of the seal outer element 12 comprised of the first seal lip 32, the lower bend portion 34 and the body portion 33. A second body portion 39 bridges between the lip 38 and a cylindrical inner support 40. The configured annular extension of the lip 38 from the second body portion 39 in combination with elastomeric resilient composition thereof permits radial contraction and expansion of the lip 38.

Stiffness of the cylindrical supports 36 and 40 of the seal outer element 12 and the seal inner element 14 respectively is desired whereby they will retain their press fit relationships with the link inner end 20 and the spacer ring 28 respectively. The stiffness may be provided by modifying the composition of the elastomeric material and/or altering the curing process in the region of the cylindrical supports 36 and 40 without detracting from the desired resiliency characteristics of the lips 32 and 38. The preferred embodiment, however, includes the process whereby an "L" cross sectional shaped metal outer stiffener ring 42 is bonded or otherwise integrally formed with relation to the elastomeric material of the outer seal element 12. Similarly an inner stiffener ring 44 is formed with relation to the elastomeric material of the inner seal element 14.

With reference to FIG. 3, another embodiment of the present invention is disclosed in which a reversal or inside out arrangement of the seal elements, with relation to the embodiment of FIG. 2, is shown. In the FIG. 3 embodiment the seal assembly 10 is comprised of a seal outer element 114 and a seal inner element 112. A comparison of the seal cross sections depicted in FIG. 2 and FIG. 3 clearly illustrates the inside out variation of the seal outer element 114 relative to the seal inner element 14 and seal inner element 112 relative to seal outer element 12. It will be understood the embodiments shown in either FIG. 2 or FIG. 3 can be located or disposed within recess 22 as shown in FIG. 1.

In the FIG. 3 embodiment a first seal lip 132 is formed as an outside diameter portion of the seal inner element 112. In the cross sectional view of the annularly formed seal element the lip 132 is an upper extremity of an "S" shaped figure wherein a first body portion 133 and an upper bend portion 134 cooperate in combination with elastomeric resilient composition thereof to permit radial expansion and contraction of the lip 132. The body portion 133 in its radially inward formation becomes a lower bend portion 135 which transfigures into a cylindrical inner support 136.

A second seal lip 138 is formed as an inside diameter portion of the seal outer element 114. In the cross sectional view of the annularly formed seal element the lip 138 is a lower extremity of a generally "C" shaped figure whose inner boundary is shaped in a complementary fashion with reference to an outer bend boundary of the seal inner element 112 comprised of the first seal lip 132, the upper bend portion 134 and the body portion 133. A second body portion 139 bridges between the lip 138 and a cylindrical outer support 140. The configured annular extension of the lip 138 from the second body portion 139 in combination with elastomeric resilient composition thereof permits radial contraction and expansion of the lip 138.

As was previously described with regard to the embodiment of FIG. 2 stiffness of the cylindrical supports 136 and 140 of the seal inner element 112 and the seal outer element 114 respectively may include "L" cross sectionally shaped metal rings. The cylindrical inner support 136 may therefore include an inner stiffener ring 142 and the cylindrical outer support may include an outer stiffener ring 144, both bonded or otherwise integrally formed therewith.

Referring to FIG. 2, physical sealing engagement between outer element 12 and inner element 14 is accomplished normally by two means of annular lineal contact therebetween. The first means of annular lineal contact comprises first lip 32 engaged with cylindrical inner support 40. The second means of annular lineal contact comprises second lip 38 engaged with cylindrical outer support 36.

In a similar manner, referring to FIG. 3, physical sealing engagement between outer element 114 and inner element 112 is accomplished normally by two means of annular lineal contact therebetween. The first means of annular lineal contact comprises first lip 132 engaged with cylindrical outer support 140. The second means of annular lineal contact comprises second lip 138 engaged with cylindrical inner support 136. Because the two seal elements of each embodiment are relatively rotatable one with relation to the other, a double seal is thereby provided against damaging material entering through the gap 30 to the joint 16 bearing surfaces. It will also be noted that a labyrinth area 46 is formed between the two lip seal mediums by the complementary shaping of seal elements as previously described. A further seal against passage of damaging material is provided in the FIG. 2 embodiment by the assembled close contact between the axial end face of the track bushing 18 and the second body portion 39 of the seal inner element 14.

The free position of the lips 32 and 38, 138 and 132 respectively in the "as manufactured" shape when compared to their positions when assembled is indicative of a resilient bias for the purpose of providing positive sealing mediums. Also it is readily apparent that relatively pronounced axial displacement, within predetermined limits, of one seal element with relation to the other is possible before either lip will disengage from its sealing function. It has been found that this feature permits appreciable latitude in manufacturing variations and assembly of the track joint components. It has also been found that the sealing effect of the labyrinth area 46 is enhanced by assembling the two seal elements with a liberal application of a lubricant between them. As the seal elements are brought axially together in assembly, excess lubricant is forced out of the labyrinth area past the lip 32 or 132.

In either the embodiment of FIG. 2 or FIG. 3 it is to be understood that the lips of the inner and outer seal elements project axially in the same direction thereby, in combination with a labyrinth area formed therebetween, a multiple barrier system is provided that prevents entrance of damaging material into a bearing area.

Having thus described preferred embodiments, the present invention is seen to provide a novel two-element lip type seal having utility in combination with a mechanical joint. Several advantages and characteristics including those apparent from the foregoing description and others are inherent in the invention. It is anticipated that changes and modifications to the described form of the seal will occur to those skilled in the art and that such changes and modifications may be made without departing from the spirit of the invention or the scope of the appended claims.

What is claimed is:

1. A seal assembly, having an annular configuration adapted to form a barrier against damaging material which may enter bearing areas of relatively rotatable components of a pivot joint in a track linkage, or like mechanical joint, having a bushing forming component mounted for rotational and limited axial movement on a pivot pin forming component the ends of which are secured in associated end support members, said seal assembly comprising a pair of annular seal elements adapted to be arranged in axially inner and outer relationship and to be disposed in a recess in the bushing end face and between confronting radially spaced face portions of said pivot pin and said bushing end, said inner and outer seal elements, when seated in said recess, having radially spaced support portions seated in fixed relation on said confronting radially spaced face portions, said inner and outer seal elements having integral resilient deformable lip formations thereon which extend axially in radially spaced relation to the associated face portion and to each other, and each of said lip formations on said pair of seal elements extending in a recess formed in the associated seal element in an area between the lip formation and the support face portion of said associated seal element and engaging in seal forming relation with said support face portion of said associated seal element, thereby forming a closed annular compartment in the form of a labyrinth which is defined by said lip formations and adjoining portions of the respective seal elements which are in confronting relation and which extend between the seal forming engagement of said lip formations with said support face portions.

2. The seal element of claim 1 wherein said lip formation of the inner seal element is deformed radially inwardly and the lip on the outer seal element is deformed radially outwardly when said seal elements are assembled.

3. The seal assembly of claim 1 wherein one of said lip formations is deformed radially outwardly and the other one of said lip formations is deformed radially inwardly when said inner and outer seal elements are in assembled relation.

4. The seal assembly of claim 1 wherein said inner seal element has an axially inwardly facing surface in a plane normal to the axis of said pivot pin, and said surface contacts in sealing relation a relatively rotatable mating surface associated with said bushing forming component of said joint.

5. The seal assembly of claim 1 wherein said lip formations are radially spaced from their associated support portions by radially extending wall forming portions each having inner and outer faces with confronting ones thereof configured to form annular recesses opening in an opposite axial direction into which recesses said lip formations extend.

* * * * *